United States Patent [19]
Kuo et al.

[11] Patent Number: 5,932,146
[45] Date of Patent: *Aug. 3, 1999

[54] AIR ELECTRODE COMPOSITION FOR SOLID OXIDE FUEL CELL

[75] Inventors: Lewis Kuo, Monroeville; Roswell J. Ruka, Pittsburgh; Subhash C. Singhal, Murrysville, all of Pa.

[73] Assignee: Siemens Westinghouse Power Corporation, Orlando, Fla.

[ * ] Notice: This patent is subject to a terminal disclaimer.

[21] Appl. No.: 08/995,078

[22] Filed: Dec. 19, 1997

(Under 37 CFR 1.47)

Related U.S. Application Data

[63] Continuation-in-part of application No. 08/608,889, Feb. 29, 1996, Pat. No. 5,686,198.

[51] Int. Cl.$^6$ ...................................................... H01B 1/06
[52] U.S. Cl. ........................... 252/521.1; 429/30; 429/31; 429/33; 429/40; 252/509; 204/291
[58] Field of Search .................. 429/40, 30, 33, 429/31; 204/291; 252/509, 521.1; 501/152

[56] References Cited

U.S. PATENT DOCUMENTS

| | | | |
|---|---|---|---|
| 4,052,532 | 10/1977 | Tannenberger et al. | 429/33 |
| 4,133,778 | 1/1979 | Gray | 252/517 |
| 4,174,260 | 11/1979 | Schmidberger | 204/260 |
| 4,197,362 | 4/1980 | Schmidberger et al. | 429/12 |
| 4,562,124 | 12/1985 | Ruka | 429/30 |
| 4,645,622 | 2/1987 | Kock | 252/521 |
| 4,751,152 | 6/1988 | Zymboly | 429/31 |
| 4,767,518 | 8/1988 | Maskalick | 204/242 |
| 4,874,678 | 10/1989 | Reichner | 429/30 |
| 4,888,254 | 12/1989 | Reichner | 429/31 |
| 5,106,706 | 4/1992 | Singh et al. | 429/31 |
| 5,108,850 | 4/1992 | Carlson et al. | 429/31 |
| 5,277,995 | 1/1994 | Ruka et al. | 429/31 |
| 5,342,704 | 8/1994 | Vasilow et al. | 429/31 |
| 5,686,198 | 11/1997 | Kuo et al. | 429/30 |

FOREIGN PATENT DOCUMENTS

593281A2   4/1994   European Pat. Off. .

OTHER PUBLICATIONS

Mori et al., "$Ln_{1-x}AE_xMnO_3$ (Ln=Lanthanum Concentrate Lanthanoids, AE=Sr,Ca) as a Cathode Material in Solid Oxide Fuel Cells", The 2nd International Fuel Cell Conference, Feb. 5–8, 1996.

*Primary Examiner*—Bruce F. Bell

[57] ABSTRACT

An air electrode composition for a solid oxide fuel cell is disclosed. The air electrode material is based on lanthanum manganite having a perovskite-like crystal structure $ABO_3$. The A-site of the air electrode composition comprises a mixed lanthanide in combination with rare earth and alkaline earth dopants. The B-site of the composition comprises Mn in combination with dopants such as Mg, Al, Cr and Ni. The mixed lanthanide comprises La, Ce, Pr and, optionally, Nd. The rare earth A-site dopants preferably comprise La, Nd or a combination thereof, while the alkaline earth A-site dopant preferably comprises Ca. The use of a mixed lanthanide substantially reduces raw material costs in comparison with compositions made from high purity lanthanum starting materials. The amount of the A-site and B-site dopants is controlled in order to provide an air electrode composition having a coefficient of thermal expansion which closely matches that of the other components of the solid oxide fuel cell.

28 Claims, 3 Drawing Sheets

AIR ELECTRODE COMPOSITION FOR SOLID OXIDE FUEL CELL

CROSS REFERENCE TO RELATED APPLICATION

This application is a continuation-in-part of U.S. patent application Ser. No. 08/608,889 filed Feb. 29, 1996, now U.S. Pat. No. 5,686,198.

STATEMENT OF GOVERNMENT INTEREST

The Government of the United States of America has certain rights in this invention pursuant to contract number DE-FC21-91MC28055 awarded by the United States Department of Energy.

FIELD OF THE INVENTION

The present invention relates to solid oxide fuel cells, and more particularly relates to an electrode composition for use in such fuel cells comprising mixed lanthanides.

BACKGROUND INFORMATION

Solid oxide fuel cells (SOFCs) are used to generate electrical energy through electrochemical reactions between air and hydrocarbon fuel gas to produce a flow of electrons in an external circuit. Generators based on SOFCs offer a clean and highly efficient approach for electrochemical generation of electricity. Conventional SOFCs typically include a ceramic air electrode or cathode in the form of a porous tube made of doped lanthanum manganite. The outer surface of the air electrode is mostly covered by a solid electrolyte material made of yttria-stabilized zirconia. The outer surface of the solid electrolyte is typically covered with a cermet fuel electrode or anode made of nickel-zirconia.

Conventional solid oxide fuel cells are disclosed in U.S. Pat. Nos. 4,395,469 to Isenberg, 4,476,196 to Poppel et al., 4,476,198 to Ackerman, et al., 4,490,444 to Isenberg, 4,562,124 to Ruka, 4,751,152 to Zymboly, 4,767,518 to Maskalick, 4,888,254 to Reichner, 5,106,706 to Singh, et al., 5,108,850 to Carlson, et al., 5,277,995 to Ruka, et al. and 5,342,704 to Vasilow, et al. Each of these patents is incorporated herein by reference.

The air electrodes of conventional solid oxide fuel cells typically have porosities of from about 20 to 40 percent, and also have good electrical conductivities. The air electrodes are usually comprised of oxides having a perovskite-like crystal structure ($ABO_3$), such as $LaMnO_3$ wherein the La occupies the A-site and the Mn occupies the B-site. Conventional SOFC air electrode materials based on $LaMnO_3$ are typically made with high purity lanthanum oxide, which is costly. In order to reduce raw material costs, the use of lower cost mixed lanthanides as replacements for high purity lanthanum in the production of air electrodes has been investigated.

An article entitled "$Ln_{1-x}AE_xMnO_3$ (Ln=Lanthanum Concentrate Lanthanoids, AE=Sr, Ca) as a Cathode Material in Solid Oxide Fuel Cells", by Mori et al. of the Central Research Institute of Electric Power Industry-Japan, discloses air electrode compositions synthesized using a mixed lanthanide. The compositions proposed by Mori et al. are of the general formula $Ln_{1-x}AE_xMnO_3$, where Ln is a mixed lanthanide and AE is Sr or Ca. Unlike typical mixed lanthanides which contain La, Ce, Pr and Nd, the mixed lanthanide disclosed by Mori et al. is a left-over rare-earth mineral after Nd separation. This material comprises mainly La, Ce, Pr and a trace amount of Nd. Mori et al. disclose that by varying the A-site doping level (either Sr or Ca) in the air electrode composition, adequate coefficient of thermal expansion (CTE) and electrical conductivity properties can be achieved. However, there are several drawbacks associated with this approach. The issue of dimensional stability is not addressed. The CTE values are controlled by the Sr or Ca doping level. In order to achieve a desired CTE value of, for example, $10.5 \pm 0.1 \times 10^{-6}/°C$, the Sr doping has to be close to 15 atomic percent and the Ca doping must be close to 30 atomic percent in the A-sites. This requirement significantly affects the flexibility for composition adjustments needed to optimize other critical air electrode properties. Although Mori et al. does not disclose thermal expansion properties, it is mentioned that both of the Sr-doped and Ca-doped compositions exhibit anomalies in the thermal expansion curves between room temperature and 1,000° C. Such anomalies are typically due to a phase transition (rhombohedral to orthorhombic transformation for the Sr-doped compositions and hexagonal to tetragonal transformation for the Ca-doped compositions) which can occur in this temperature range. Such anomalies can be minimized by proper doping in the A-site. The compositions disclosed by Mori et al., however, do not have the flexibility for such a composition adjustment since either the Sr or Ca doping level needs to be fixed at a given level in order to achieve the desired CTE value.

U.S. Pat. No. 5,686,198 to Kuo et al. filed Feb. 29, 1996, which is incorporated herein by reference, discloses the use of mixed lanthanides in making SOFC air electrodes. Two general formulas for air electrode compositions are disclosed: $(La_{1-w-x-y}Ln_wCe_xMa_y)(Mn_{1-z}Mb_z)O_3$; and $(La_{1-w-0.2}Ln_wCa_{0.2})(Mn_{1-z}(Ni \text{ or } Mg)_z)O_3$. In both formulas, Ln is a mixed lanthanide comprising La, Ce, Pr, Nd and Sm, Ma is Ca, Sr or Ba, and Mb is Mg, Ni, Cr, Al or Fe. In these compositions, the CTE values are primarily controlled by the La/Ln ratio.

SUMMARY OF THE INVENTION

The present invention discloses an effective method to achieve favorable SOFC air electrode properties. Individual rare earth elements such as La, Ce, Pr, Nd, Sm, Eu and/or Gd are used as additional A-site dopants in combination with Ca or other alkaline earth dopants. In addition, certain B-site dopants, such as Cr, Ni, Mg, Co and the Al, are added to the perovskite structure to suppress the oxidative nonstoichiometry of the air electrode in order to improve dimensional stability.

An object of the present invention is to provide a solid oxide fuel cell air electrode composition having a perovskite-like crystal structure of the formula $ABO_3$, wherein the A-site comprises a combination of a mixed lanthanide and multiple A-site dopants, and the B-site comprises a combination of Mn and at least one B-site dopant. The mixed lanthanide preferably comprises La, Ce, Pr and, optionally, Nd. The A-site dopants include at least one rare earth element selected from La, Ce, Pr, Nd, Sm, Eu and Gd, and at least one alkaline earth element selected from Ca, Sr and B. The B-site dopant is selected from Mg, Al, Cr, Ni, Co, Fe and combinations thereof.

Another object of the present invention is to provide a solid oxide fuel cell air electrode composition of the formula: $(Ln_{0.2\pm0.1}RE_{0.6\pm0.1}AE_{0.2\pm0.2})(Mn_{0.9\pm0.05}M_{0.1\pm0.05})O_3$, wherein Ln is a mixed lanthanide comprising La, Ce and Pr, RE is at least one rare earth element selected from La, Ce, Pr, Nd, Sm, Eu and Gd, AE is at least one alkaline earth element selected from Ca, Sr and Ba, and M is at least one element selected from Mg, Al, Cr, Ni, Co and Fe.

Another object of the present invention is to provide a method of making a solid oxide fuel cell air electrode composition having a perovskite-like crystal structure of the formula $ABO_3$. The method includes the steps of forming an oxide mixture comprising a mixed lanthanide, A-site dopants including a combination of rare earth and alkaline earth elements, and at least one B-site dopant, followed by calcining and sintering the mixture.

Another object of the present invention is to provide a method of making a solid oxide fuel cell air electrode composition of the formula: $(Ln_{0.2\pm0.1}RE_{0.6\pm0.1}AE_{0.2\pm0.1})(Mn_{0.9\pm0.05}M_{0.1\pm0.05})O_3$, wherein Ln is a mixed lanthanide comprising La, Ce and Pr, RE is at least one rare earth element selected from the group consisting of La, Ce, Pr, Nd, Sm, Eu and Gd, AE is at least one alkaline earth element selected from the group consisting of Ca, Sr and Ba, and M is at least one element selected from the group consisting of Mg, Al, Cr, Ni, Co and Fe. The method includes the steps of forming an oxide mixture comprising a mixed lanthanide, at least one rare earth A-site dopant, at least one alkaline earth A-site dopant, and at least one B-site dopant, followed by calcining and sintering.

These and other objects of the present invention will be more readily understood from the following description.

DETAILED DESCRIPTION OF THE PREFERRED EMBODIMENTS

Solid oxide fuel cell generators include a gas-tight, thermally insulated housing which houses individual chambers including a generator chamber and a combustion chamber. The generator chamber, in which power generation occurs, contains a solid oxide fuel cell stack which is made up of an array of axially elongated, tubular, series-parallel connected solid oxide fuel cells, and associated fuel and air distributing equipment. The solid oxide fuel cells contained in the generator chamber can take on a variety of well known configurations, including tubular, flat plate, and corrugated designs, which are taught in U.S. Pat. Nos. 4,395,468 to Isenberg and 4,490,444 to Isenberg for tubular SOFCs, U.S. Pat. No. 4,476,196 to Poppel et al. for flat plate SOFCs, and U.S. Pat. No. 4,476,198 to Ackerman et al. for corrugated SOFCs. While tubular solid oxide fuel cells are discussed primarily herein, it is to be understood that air electrodes for use in other SOFC configurations are within the scope of the invention.

Figure 1:
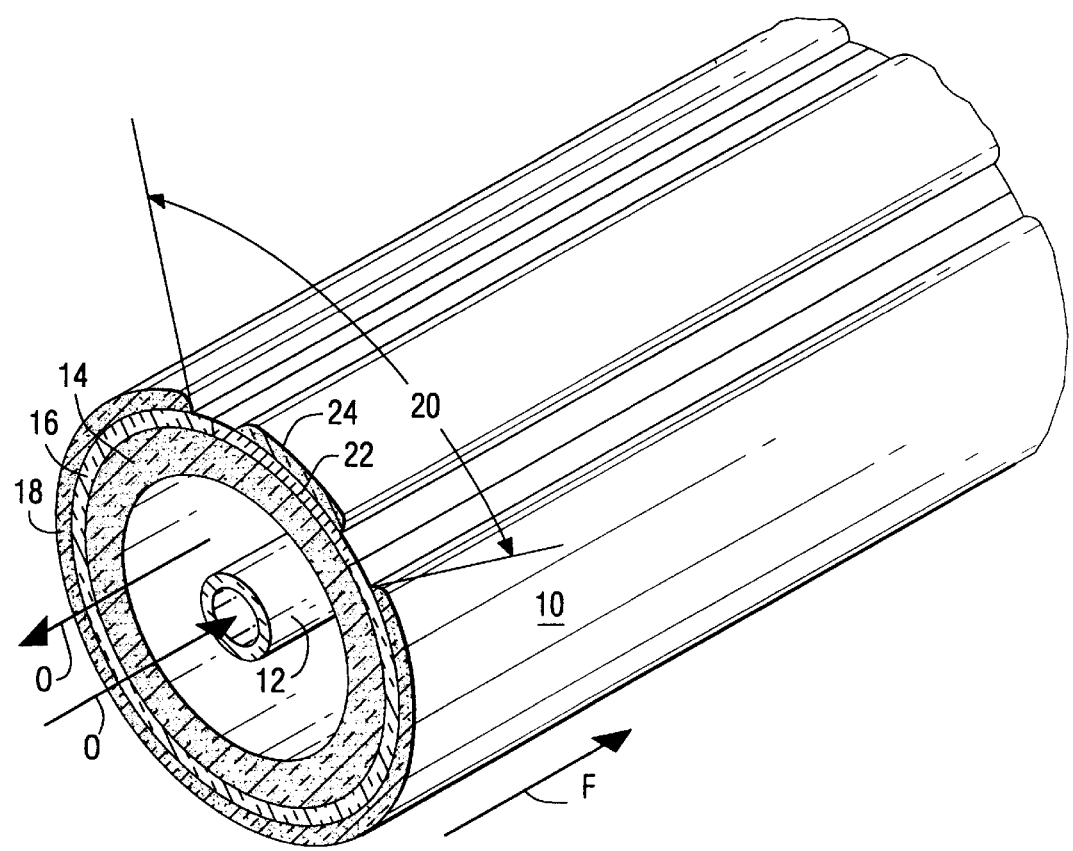
FIG. 1 is a sectional perspective view of a solid oxide fuel cell including an air electrode composition in accordance with the present invention.

FIG. 1 shows a preferred tubular solid oxide fuel cell 10. The preferred configuration is based upon a fuel cell system in which a flowing gaseous fuel, such as natural gas, hydrogen or carbon monoxide, is directed axially over the outside of the fuel cell, as indicated by the arrow F. A flowing oxidant, such as air or oxygen, is fed through an optional riser tube 12, positioned within the annulus of the fuel cell and extending near the closed end of the fuel cell, and then out of the riser tube back down the fuel cell axially over the inside wall of the fuel cell, as indicated by the arrow O.

The solid oxide fuel cell comprises a tubular air electrode 14 (or cathode). The air electrode 14 may have a typical length of about 50 to 250 cm and a typical thickness of about 1 to 3 mm. In accordance with the present invention, the air electrode 14 comprises doped lanthanum manganite having an $ABO_3$ perovskite-like crystal structure, which is extruded or isostatically pressed into tubular shape and then sintered. A process of making air electrodes is disclosed in detail in U.S. Pat. No. 5,686,198, which is incorporated herein by reference.

Surrounding most of the outer periphery of the air electrode 14 is a layer of a dense, gas-tight, oxygen ion permeable, solid electrolyte 16, typically made of calcia- or yttria-stabilized zirconia. A preferred solid electrolyte composition is $(Y_2O_3)_{0.1}(ZrO_2)_{0.9}$, which has a coefficient of thermal expansion of about $10.5\times10^{-6}/°C$. The solid electrolyte 16 is typically about 0.001 to 0.1 mm thick, and can be deposited onto the air electrode 14 by conventional electrochemical vapor deposition (EVD) techniques.

A selected radial segment 20 of the air electrode 14, preferably extending along the entire active cell length, is masked during fabrication of the solid electrolyte, and is covered by a thin, dense, gas-tight, interconnection 22, which provides an electrical contacting area to an adjacent cell (not shown) or to a power contact (not shown), as known in the art. The interconnection 22, covering the surface of the air electrode 14 along most of the radial segment 20, must be electrically conductive in both an oxidant and fuel environment at elevated temperatures. The interconnection 22 is typically made of lanthanum chromite ($LaCrO_3$) doped with calcium, barium, strontium, magnesium or cobalt, and has a coefficient of thermal expansion of about $10.5\times10^{-6}/°C$. The interconnection 22 is roughly similar in thickness to the solid electrolyte 16. The interconnection 22 should be non-porous, e.g., at least about 95% dense, and electrically conductive at 1,000° C., the usual operating temperature of the fuel cell. The interconnection 22 can be deposited onto the air electrode 14 by high temperature, electrochemical vapor deposition (EVD) techniques. An electrically conductive top layer 24 approximately 0.05 to 0.1 mm thick is deposited over the interconnection 22, and is typically made of nickel or a nickel-zirconia or cobalt-zirconia cermet of the same composition as the fuel electrode described below.

Surrounding the remainder of the outer periphery of the fuel cell 10, on top of the solid electrolyte 16, except at the interconnection area 20, is a fuel electrode 18 (or anode), which is in contact with the fuel during operation of the cell. The fuel electrode 18 is a thin, electrically conductive, porous structure, typically made of nickel-zirconia or cobalt-zirconia cermet approximately 0.03 to 0.1 mm thick. As shown, the solid electrolyte 16 and fuel electrode 18 are discontinuous, with the fuel electrode being spaced-apart from the interconnection 22 to avoid direct electrical contact. The fuel electrode 18 and conductive layer 24 can be deposited on the solid electrolyte 16 and interconnection 22, respectively, by known techniques such as dipping or spraying.

During operation at approximately 1,000° C., a gaseous fuel, such as hydrogen ($H_2$) or carbon monoxide (CO), or sometimes natural gas (primarily comprising methane), is directed over the outside of the fuel cell 10, and a source of oxygen, such as air or oxygen ($O_2$), is passed through the inside of the fuel cell. The oxygen molecules pass through the porous electrically conductive air electrode 14 and form oxygen ions at the interface between the air electrode 14 and solid electrolyte 16. The oxygen ions then migrate through the solid electrolyte 16 material to combine with the fuel at the interface between the electrolyte 16 and fuel electrode 18. The oxygen ions release electrons at the fuel electrode 18, which are then collected at the air electrode through an external load circuit, thus generating a flow of electrical current in an external circuit from the fuel electrode 18 to the air electrode 14. The electrochemical reaction of oxygen with fuel thus produces a potential difference across the external load which maintains a continuous electron and oxygen ion flow in a closed circuit during the generation of electricity. Multiple cells can be electrically connected in series by contact between the interconnection of one cell and the fuel electrode of another cell. The cells can also be electrically connected in parallel by contact between the fuel electrode of one cell and the fuel electrode of another cell.

The porous air electrode remains exposed to a hot oxidant gas atmosphere, usually air, heated to approximately 1,000° C. during generator operation. Furthermore, oxygen reduction takes place at the air electrode-electrolyte interface. In the tubular fuel cell configuration, the porous, electrically conductive, air electrode 14 maintains intimate contact with the dense, gas-tight, oxygen ion conductive, solid electrolyte 16, and the dense, gas-tight, electrically conductive, interconnection 22. The selection of a suitable air electrode must be done carefully to ensure that the air electrode has certain properties including high conductivity at the high operating temperatures, low resistance contact to the solid electrolyte, good chemical, structural and dimensional stability at high operating temperatures, sufficient gas permeation porosity, and good match of the coefficient of thermal expansion with the solid electrolyte and interconnection.

Structural and dimensional stability of the air electrode, in particular, is an important criteria for maintaining long term mechanical integrity necessary for successful fuel cell operations, especially under isothermal or thermal cycling during cell fabrication and operation. For example, if an air electrode having a length of 100 cm exhibits a differential heat shrinkage of 0.05 percent compared with the solid electrolyte or interconnection, a 0.5 mm difference in length between the air electrode and the solid electrolyte or the interconnection would occur. This would result in severe stresses between the materials which could destroy the fuel cell.

In accordance with a preferred embodiment of the present invention, the air electrode composition comprises a perovskite-like crystal structure of the formula $ABO_3$, wherein the A-site comprises a combination of a mixed lanthanide and multiple A-site dopants, and the B-site comprises Mn and at least one B-site dopant. The A-site dopants comprise at least one rare earth element selected from La, Ce, Pr, Nd, Sm, Eu and Gd, and at least one alkaline earth element selected from Ca, Sr and Ba. The B-site dopants are selected from Mg, Al, Cr, Ni, Co and Fe. In one embodiment, the mixed lanthanide comprises La, Ce, Pr and Nd, along with trace amounts of other elements. In another embodiment, the mixed lanthanide comprises La, Ce and Pr, with only trace amounts of Nd and other elements. The rare earth A-site dopants preferably comprise La, Nd or a combination thereof. The alkaline earth A-site dopant is preferably Ca. Preferred B-site dopants are Mg and Al. The A-site and B-site dopants are preferably provided in sufficient amounts to achieve a coefficient of thermal expansion of the air electrode material of about $10.4 \times 10^{-6}/°C$. to about $10.6 \times 10^{-6}/°C$.

A preferred air electrode composition of the present invention is of the formula: $(Ln_{0.2\pm0.1}RE_{0.6\pm0.1}AE_{0.2\pm0.1})(Mn_{0.9\pm0.05})O_3$, wherein Ln is a mixed lanthanide comprising La, Ce and Pr, RE is at least one rare earth element selected from the group consisting of La, Ce, Pr, Nd, Sm, Eu and Gd, AE is at least one alkaline earth element selected from the group consisting of Ca, Sr and Ba, and M is at least one element selected from the group consisting of Mg, Al, Cr, Ni, Co and Fe. In addition to La, Ce and Pr, the mixed lanthanide may optionally include Nd. A particularly preferred mixed lanthanide is of the approximate composition $La_{0.598}Nd_{0.184}Ce_{0.131}Pr_{0.081}Sr_{0.004}Ca_{0.002}$. Exemplary air electrode compositions of the present invention include $(Ln_{0.2}La_{0.4}Nd_{0.2}Ca_{0.2})(Mn_{0.9}Mg_{0.1})O_3$ and $(Ln_{0.2}La_{0.4}Nd0.2Ca_{0.2})(Mn_{0.9}Al_{0.1})O_3$.

In accordance with the present invention, the coefficient of thermal expansion of the air electrode is matched with the coefficient of thermal expansion of the solid electrolyte 16 and interconnection 22 in order to reduce dimensional shrinkage of the air electrode material, while also producing a low cost structure in order to improve the commercial attractiveness of these fuel cells, but without impairing the other desirable air electrode properties such as low resistivity and controlled porosity. In a preferred embodiment, the coefficient of thermal expansion of the air electrode material is from about $10.4 \times 10^{-6}/°C$. to about $10.6 \times 10^{-6}/°C$.

EXAMPLE

Several air electrode compositions were formulated based on the general formula $((Ln)_{1-x-z}(RE)_x(Ca)_z)(Mn_{1-y}M_y)O_3$, where Ln is of the approximate composition $La_{.598}Nd_{.184}Pr_{.081}Sm_{.000}Ce_{.131}Ca_{.002}Sr_{.004}$ (Molycorp 5211 lot 1-0423-1 powder), RE is La and/or Nd, and M is Ni, Mg or Al. These samples were triple-calcined at 1,500° C. by a conventional solid state route and sintered into bars of 70±1% density. The CTE values were determined by using these bar samples. The results are given in Table 1.

TABLE 1

| Sample No. | Composition | Coefficient of Thermal Expansion ($10^{-6}/°$ C.) |
|---|---|---|
| 1. | $(Ln_{0.6}Nd_{0.2}Ca_{0.2})(Mn_{0.9}Ni_{0.1})O_3$ | 8.9 |
| 2. | $(Ln_{0.4}La_{0.2}Nd_{0.2}Ca_{0.2})(Mn_{0.9}Ni_{0.1})O_3$ | 8.9 |
| 3. | $(Ln_{0.2}La_{0.4}Nd_{0.2}Ca_{0.2})(Mn_{0.9}Ni_{0.1})O_3$ | 10.0 |
| 4. | $(La_{0.6}Nd_{0.2}Ca_{0.2})(Mn_{0.9}Ni_{0.1})O_3$ | 10.3 |
| 5. | $(Ln_{0.2}La_{0.4}Nd_{0.2}Ca_{0.2}))Mn_{0.9}Mg_{0.1})O_3$ | 10.5 |
| 6. | $(Ln_{0.2}La_{0.4}Nd_{0.2}Ca_{0.2})(Mn_{0.9}Al_{0.1})O_3$ | 10.6 |
| 7. | $(La_{0.6}Nd_{0.2}Ca_{0.2})(Mn_{0.9}Mg_{0.1})O_3$ | 10.9 |
| 8. | $(La_{0.6}Nd_{0.2}Ca_{0.2})(Mn_{0.9}Al_{0.1})O_3$ | 11.1 |

Figure 2:
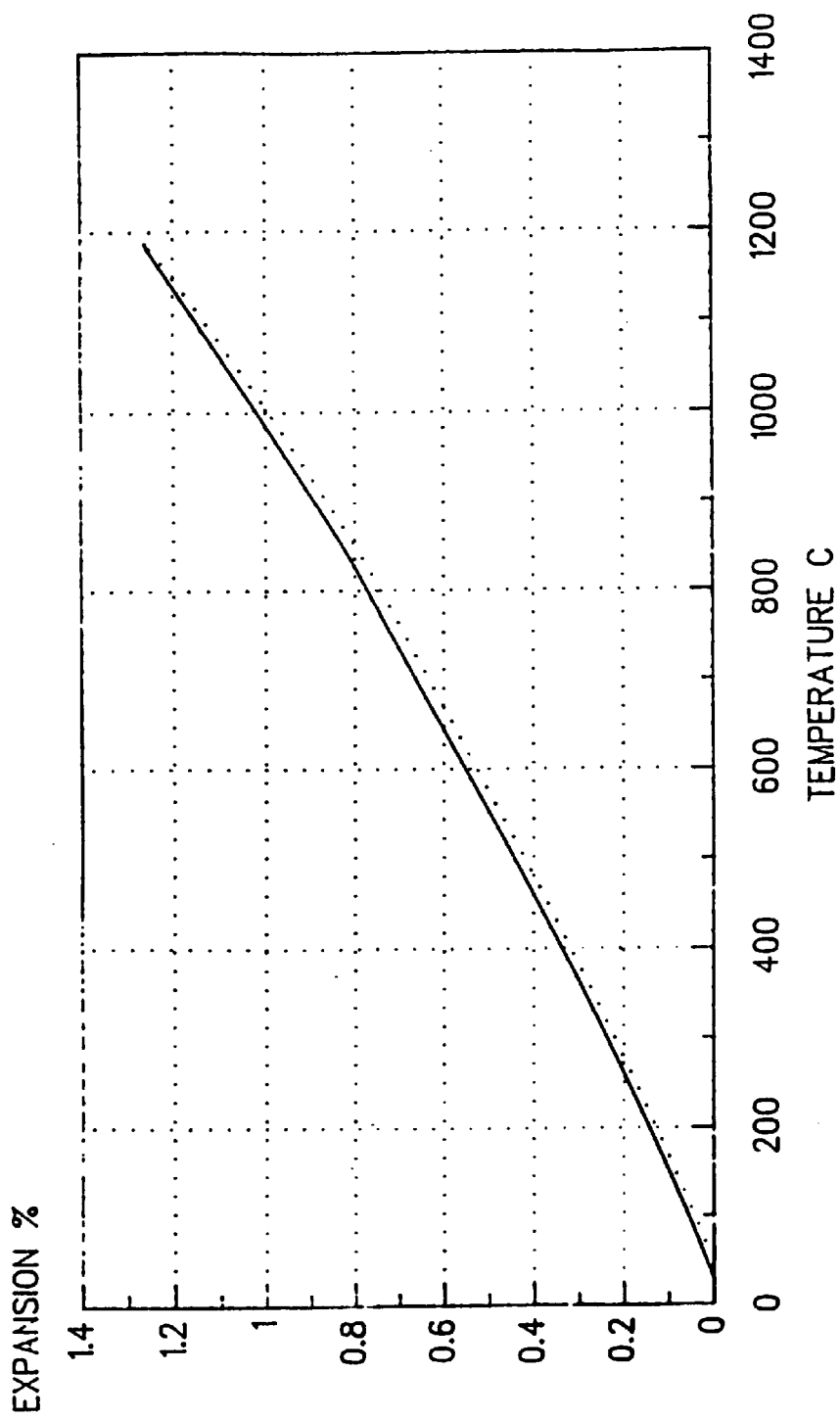
FIG. 2 is a graph showing the thermal expansion behavior of a solid oxide fuel cell electrode material in accordance with an embodiment of the present invention.
Figure 3:
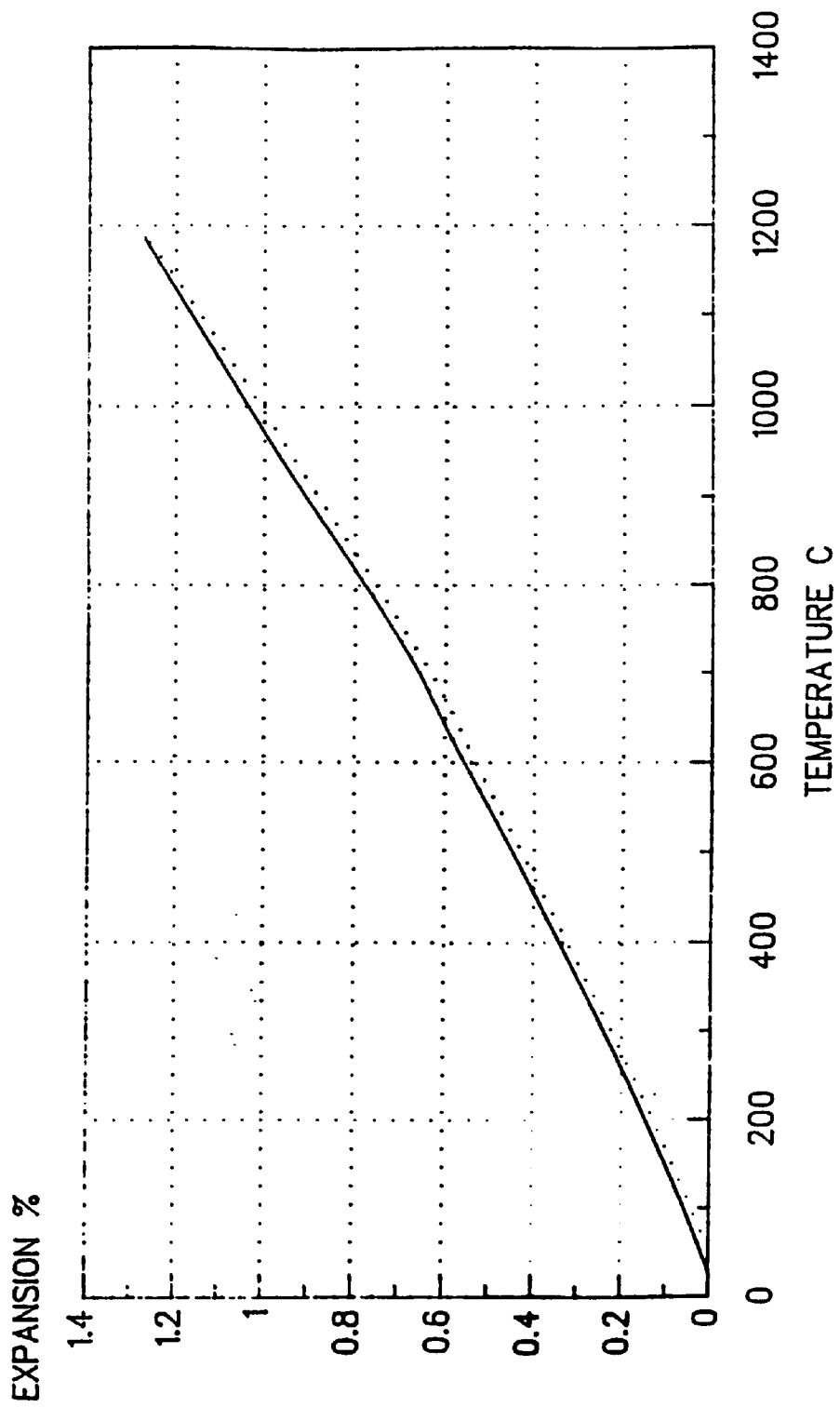
FIG. 3 is a graph showing the thermal expansion behavior of a solid oxide fuel cell electrode material in accordance with another embodiment of the present invention.

As can be seen from the data in Table 1, Sample Nos. 5 and 6 having the compositions $(Ln_{0.2}La_{0.4}Nd_{0.2}Ca_{0.2})(Mn_{0.9}Mg_{0.1})O_3$ and $(Ln_{0.2}La_{0.4}Nd_{0.2}Ca_{0.2})(Mn_{0.9}Al_{0.1})O_3$ are within the desirable CTE range of $10.5\pm0.1\times10^{-6}/°C$. Furthermore, these two compositions do not exhibit any anomaly in their thermal expansion behavior due to any phase change in the 25–1,000° C. temperature range, as shown in FIGS. 2 and 3, respectively.

While particular embodiments of the invention are described herein, it is to be understood that various modifications, changes and additions may be made within the scope of the invention, as set forth in the following claims.

What is claimed is:

1. A solid oxide fuel cell air electrode composition comprising a perovskite crystal structure of the formula $ABO_3$, wherein:
   (a) the A-site comprises:
      (1) a mixed lanthanide; and
      (2) A-site dopants comprising at least one rare earth element selected from the group consisting of La, Ce, Pr, Nd, Sm, Eu and Gd, and at least one alkaline earth element selected from the group consisting of Ca, Sr and Ba; and
   (b) the B-site comprises Mn and at least one B-site dopant selected from the group consisting of Mg, Al, Cr, Ni, Co and Fe.

2. The composition of claim 1, wherein the A-site and B-site dopants are present in sufficient amounts to achieve a coefficient of thermal expansion of the composition of from about $10.4 \times 10^{-6}/°C$ to about $10.6 \times 10^{-6}/°C$.

3. The composition of claim 1, wherein the mixed lanthanide comprises La, Ce, Pr and Nd.

4. The composition of claim 1, wherein the mixed lanthanide comprises La, Ce and Pr.

5. The composition of claim 4, wherein the mixed lanthanide is substantially free of Nd.

6. The composition of claim 1, wherein the at least one rare earth element A-site dopant is La, Nd or a combination thereof.

7. The composition of claim 1, wherein the at least one rare earth element A-site dopant is a combination of La and Nd.

8. The composition of claim 1, wherein the at least one alkaline earth element A-site dopant is Ca.

9. The composition of claim 1, wherein the B-site dopant is Mg.

10. The composition of claim 1, wherein the B-site dopant is Al.

11. The composition of claim 1, wherein the at least one rare earth element A-site dopant is a combination of La and Nd, the at least one alkaline earth element A-site dopant is Ca, and the B-site dopant is Mg or Al.

12. A solid oxide fuel cell air electrode composition of the formula:

$$(Ln_{0.2 \pm 0.1} RE_{0.6 \pm 0.1} AE_{0.2 \pm 0.1})(Mn_{0.9 \pm 0.05} M_{0.1 \pm 0.05})O_3,$$

wherein Ln is a mixed lanthanide comprising La, Ce and Pr; RE is at least one rare earth element selected from the group consisting of La, Ce, Pr, Nd, Sm, Eu and Gd; AE is at least one alkaline earth element selected from the group consisting of Ca, Sr and Ba; and M is at least one element selected from the group consisting of Mg, Al, Cr, Ni, Co and Fe.

13. The composition of claim 12, wherein the mixed lanthanide further comprises Nd.

14. The composition of claim 12, wherein the mixed lanthanide is of the approximate composition $La_{0.598}Nd_{0.184}Ce_{0.0131}Pr_{0.081}Sr_{0.004}Ca_{0.002}$.

15. The composition of claim 12, wherein the at least one rare earth element is La, Nd or a combination thereof.

16. The composition of claim 12, wherein the at least one rare earth element is a combination of La and Nd.

17. The composition of claim 12, wherein the at least one alkaline earth element is Ca.

18. The composition of claim 12, wherein M is Mg.

19. The composition of claim 12, wherein M is Al.

20. The composition of claim 12, wherein the composition is of the formula $(Ln_{0.2}La_{0.4}Nd_{0.2}Ca_{0.2})(Mn_{0.9}Mg_{0.1})O_3$.

21. The composition of claim 20, wherein Ln is of the approximate composition $La_{0.598}Nd_{0.184}Ce_{0.131}Pr_{0.081}Sr_{0.004}Ca_{0.002}$.

22. The composition of claim 12, wherein the composition is of the formula $(Ln_{0.2}La_{0.4}Nd_{0.2}Ca_{0.2})(Mn_{0.98}Al_{0.1})O_3$.

23. The composition of claim 22, wherein Ln is of the approximate composition $La_{0.598}Nd_{0.184}Ce_{0.131}Pr_{0.081}Sr_{0.004}Ca_{0.002}$.

24. The composition of claim 12, wherein the composition has a coefficient of thermal expansion of from about $10.4 \times 10^{-6}/°C$ to about $10.6 \times 10^{-6}/°C$.

25. A method of making a solid oxide fuel cell air electrode composition having a peroviskite crystal structure of the formula $ABO_3$, the method comprising:
   (a) forming a mixture comprising oxides of:
      (1) a mixed lanthanide;
      (2) A-site dopants comprising at least one rare earth element selected from the group consisting of La, Ce, Pr, Nd, Sm, Eu and Gd, and at least one alkaline earth element selected from the group consisting of Ca, Sr and Ba; and
      (3) at least one B-site dopant selected from the group consisting of Mg, Al, Cr, Ni, Co, and Fe;
   (b) calcining the mixture; and
   (c) sintering the calcined mixture.

26. The method of claim 25, further comprising providing sufficient amounts of the A-site and B-site dopants to achieve a coefficient of thermal expansion of the composition of from about $10.4 \times 10^{-6}/°C$ to about $10.6 \times 10^{-6}/°C$.

27. A method of making a solid oxide fuel cell air electrode composition, the method comprising:
   (a) forming a mixture comprising oxides of:
      (1) a mixed lanthanide comprising La, Ce, and Pr;
      (2) at least one rare earth element selected from the group consisting of La, Ce, Pr, Nd, Sm, Eu and Gd;
      (3) at least one alkaline earth element selected from the group consisting of Ca, Sr and Ba;
      (4) manganese;
      (5) at least one element selected from the group consisting of Mg, Al, Cr, Ni, Co and Fe; and
   (b) calcining the mixture; and
   (c) sintering the calcined mixture wherein the composition is of the formula $(Ln_{0.2 \pm 0.1}RE_{0.6 \pm 0.1}AE_{0.2 \pm 0.1})(Mn_{0.9 \pm 0.05}M_{0.1 \pm 0.05})O_3$, Ln is the mixed lanthanide, RE is the at least one rare earth element, AE is the at least one alkaline earth element, and M is the at least one element selected from the group consisting of Mg, Al, Cr, Ni, Co and Fe.

28. The method of claim 27, wherein the composition has a coefficient of thermal expansion of from about $10.4 \times 10^{-6}/°C$ to about $10.6 \times 10^{-6}/°C$.

* * * * *